Figure 1:
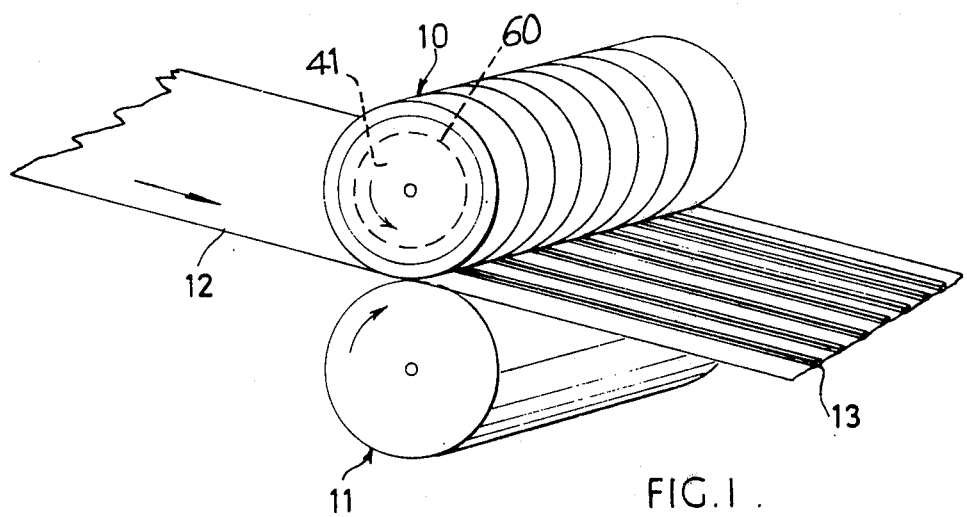

United States Patent [19]

Kroyer

[11] 4,033,709
[45] July 5, 1977

[54] MOLDING APPARATUS FOR RIBBED PRODUCT

[75] Inventor: Karl Kristian Kobs Kroyer, Copenhagen, Denmark

[73] Assignee: Karl Kroyer St. Anne's Limited, Bristol, England

[22] Filed: July 7, 1975

[21] Appl. No.: 593,189

[30] Foreign Application Priority Data

July 4, 1974 United Kingdom ............ 29652/74
July 27, 1974 United Kingdom ............ 33263/74

[52] U.S. Cl. .................... 425/224; 425/335;
425/336; 425/371; 425/373; 425/388;
425/394; 425/396; 425/471; 425/DIG. 44;
156/505; 425/369; 425/363
[51] Int. Cl.² ........................................ B29C 15/00
[58] Field of Search .................... 29/121 A, 121 R;
156/505; 425/224, 471, 194, 335, 336, 373,
371, 363, 388, 394, 396, DIG. 44

[56] References Cited

UNITED STATES PATENTS

| 1,938,444 | 12/1933 | Vedder | 29/121 A X |
|---|---|---|---|
| 2,337,969 | 12/1943 | Bugge | 425/363 X |
| 2,343,363 | 3/1944 | Black et al. | 29/121 A |
| 2,609,314 | 9/1952 | Engel et al. | 425/373 X |
| 2,782,461 | 2/1957 | Esslinger | 425/373 X |
| 2,837,042 | 6/1958 | Laval, Jr. | 29/121 A |
| 3,235,643 | 2/1966 | Hofer | 264/268 |
| 3,399,425 | 9/1968 | Lemelson | 425/373 X |
| 3,932,089 | 1/1976 | Ando | 425/363 X |

*Primary Examiner*—Robert L. Spicer, Jr.
*Attorney, Agent, or Firm*—Larson, Taylor and Hinds

[57] ABSTRACT

This invention concerns apparatus for moulding ribs, ridges, studs or other upstanding projections on a mouldable material and although not so restricted it will hereafter be described with reference to its use on apparatus for moulding dry formed fibrous material.

15 Claims, 11 Drawing Figures

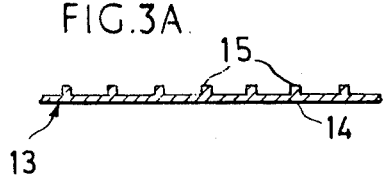
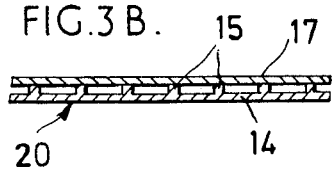
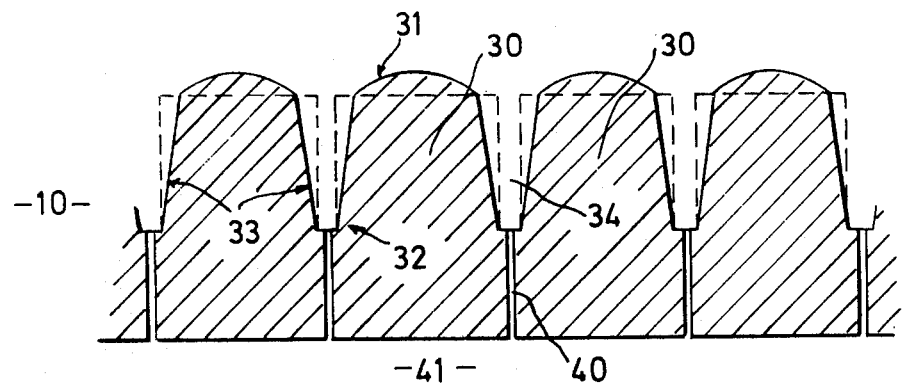
FIG. 4.
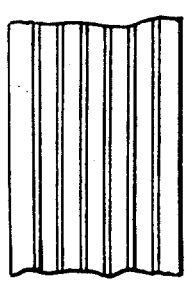
A
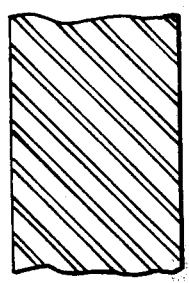
B
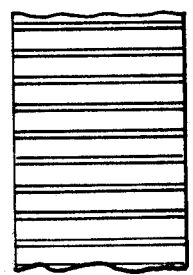
C
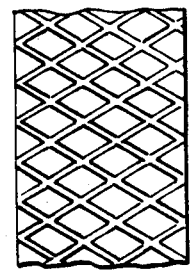
D
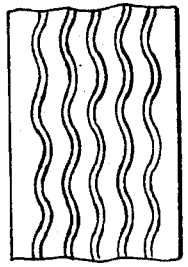
E
FIG. 5.

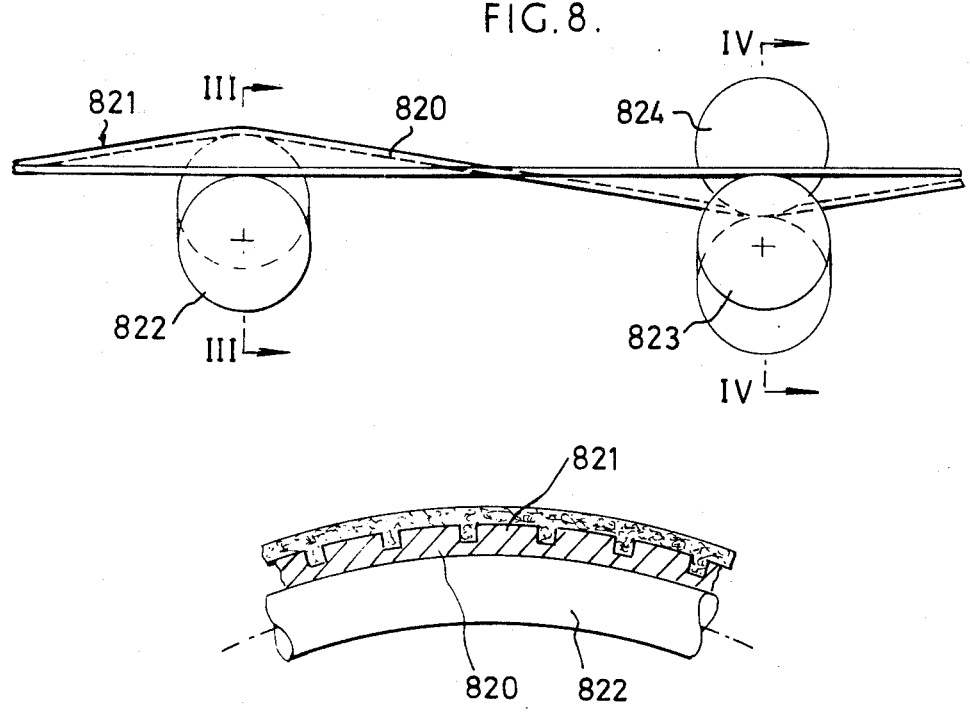
FIG. 8.
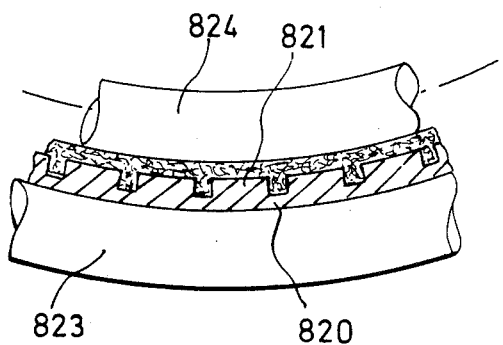
FIG. 9.
FIG. 10.

MOLDING APPARATUS FOR RIBBED PRODUCT

According to the present invention there is provided apparatus for moulding ribs, ridges, studs or other upstanding projections on a mouldable material comprising a mould having a plurality of flexible protrusions defining there between at least one moulding cavity or channel defined by the adjacent faces of the protrusions, the adjacent faces being moved when the protrusions are deformed by pressure thereby reducing the size of the cavity or channel and compacting any mouldable material therein.

Preferably the mould is provided by a roller having a plurality of rubber protrusions thereon adapted to provide a plurality off projections on an elongate sheet of mouldable material. The annular protrusions may be axially spaced across the roller to provide longitudinal ribs.

In a preferred embodiment the roller is provided by a vacuum cylinder the base of each moulding channel or cavity being in communication with the vacuum source to draw mouldable material into the channel or cavity.

Alternatively, the mould may be provided by an endless belt having a plurality of rubber protrusions thereon adapted to provide a plurality of projections on an elongate sheet of mouldable material. The protrusions may be longitudinally and/or transversely spaced on the belt to provide transverse and/or longitudinal ribs respectively.

The endless belt may be foraminous whereby in association with a vacuum cylinder the base of each moulding channel or cavity will be in communication with the vacuum source to draw mouldable material into the channel or cavity.

Preferably the crests of the protrusions are of convex form, the protrusions diverging from the crests to roots to define tapering channels there between which are deflectable to define parallel sided moulding channels.

The preferred application of the apparatus described above is a part of a dry forming machine where means are provided for feeding the dry formed webs of fibrous material to the mould.

Preferably means are provided for forming a dry formed web of material for feeding the web to the nip between a pressure cylinder and a moulding belt provided with flexible protrusions and means for reeling the ribbed web of material so formed.

Where a substitute corrugated board is required the apparatus set forth above may be modified by including means for laminating a liner sheet of material to the crests of the ribs to provide a composite board.

The invention is particularly applicable to the continuous production of ribbed materials in sheet or reel form. The ribs or ridges may be formed longitudinally of the sheet, transversely of the sheet or at any angle thereto and indeed a multiplicity of crossed ridges may be provided to form a lattice type structure thereby increasing the strength of the product so formed.

The ridges or ribs may be of forms other than planar and could be of any cross sectional shape although those of constant cross section or of tapering section would be the most commonly employed. The ribs need not be at 90° to the plane of the sheet but could be at any angle thereto. The ribs or ridges need not be linear in plan but could be for example sinusoidal to further increase the strength of the product.

According to a second aspect of the present invention there is provided a moulded product when made on the apparatus of the invention.

Figure 2:
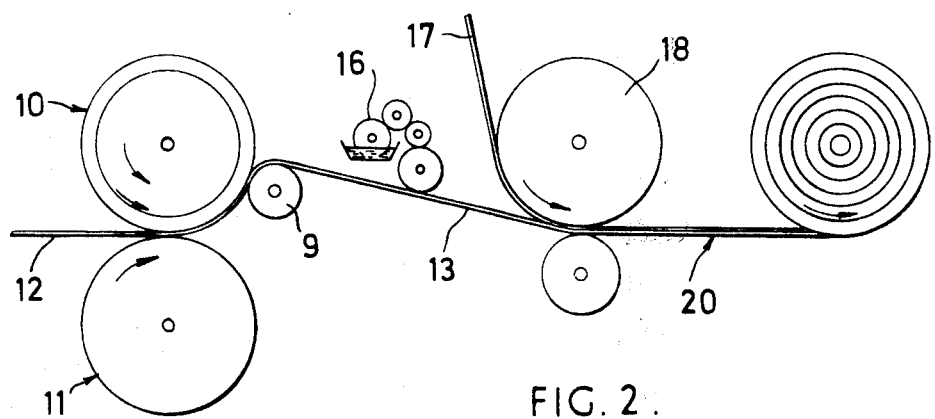
Figure 6:
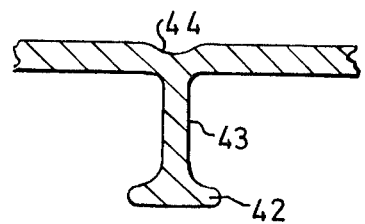
Figure 7:
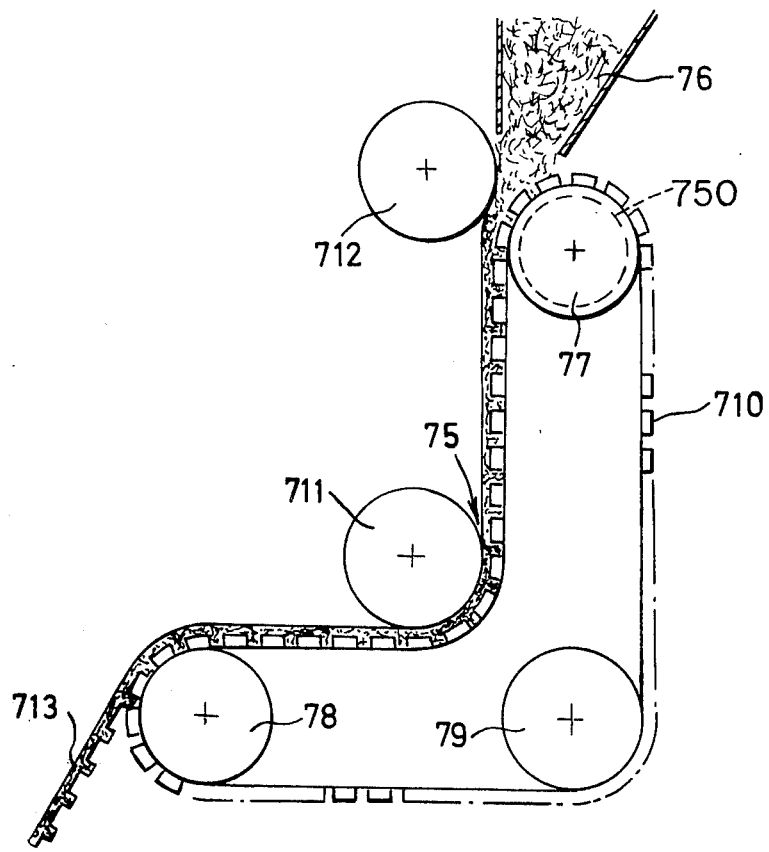

The invention is illustrated, merely by way of example in the accompanying drawings in which:

FIG. 1 is a perspective view in a diagrammatic form of a moulding cylinder and pressure roller according to the present invention, FIG. 2 is a view in diagrammatic form of apparatus according to the present invention, FIG. 3A is a cross sectional view through the product issuing from the pressure mould cylinder of the apparatus of FIG. 2, FIG. 3B is a view of the final product made on the apparatus of FIG. 2, FIG. 4 is a large section through a moulding cylinder according to the present invention, FIG. 5 is a view in plan of a number of different configurations of ribbed sheet materials made with apparatus according to the present invention, FIG. 6 is a cross section through part of one ribbed product made according to the present invention, FIG. 7 is a view in diagrammatic form of further apparatus according to the present invention incorporating a moulding belt, FIG. 8 is a view in diagrammatic form of an alternative form of apparatus according to the present invention, FIG. 9 is a cross sectional view through the apparatus of FIG. 8 taken on line III—III of FIG. 8, and FIG. 10 is a cross-sectional view through the apparatus of FIG. 8 taken on line IV—IV of FIG. 8.

Referring to FIG. 1 there is shown a moulding cylinder 10 provided with a plurality of annular rubber projections spaced axially across the roller and of a form shown in FIG. 4 and described below cooperating with a plain steel pressure roller 11. Means (not shown) are provided for feeding a sheet 12 of dry formed mouldable fibrous material to the pressure nip between the cylinders 10 and 11 whereby there issues from the nip a ribbed product 13 of the general form shown in FIG. 3A.

Referring to FIG. 3A the ribbed web at 13 comprises a base sheet 14 provided with a plurality of upstanding rectangular shape ribs 15 extending longitudinally, of the sheet.

Referring to FIG. 2 the moulding cylinder 10 and pressure roller 11 are again used and the product 13 issuing from the nip between these rollers partially wraps the moulding cylinder 10 before being removed therefrom, passing over a guide roll 9 and to a glue applicator 16. Glue from the applicator 16 is applied to the crests of the ribs 15. A liner material 17 is fed to a roller 18 by which it is pressed onto the crests of the ribs 15 thereby laminating the liner 17 to ribbed product 13 and forming a composite board 20 which in cross section is as shown in FIG. 3B.

Referring to FIG. 4 there is shown a perforated form of the mould cylinder 10 which is seen to comprise a plurality of upstanding protrusions 30 having crests 31 of convex form and a diverging shank leading to an enlarged and thicker root 32. The faces 33 of the diverging shank of each protrusion 30 defines with its opposing face of the adjacent protrusion 30 a converging channel or cavity 34 within which moulding is to take place.

When pressure is applied to the crests 31 of the protrusion 30 by cooperating between the moulding cylinder 10 and pressure cylinder 11 protruberances 30 will be deformed from the full line shape in FIG. 4 to the broken line shape shown in FIG. 4. In the broken line shape each of the protrusions 30 is of rectangular cross section and the previously convergent channel 34 will assume a rectangular section of smaller cross section.

In practise mouldable material passing across the crests 31 will flow into the enlarged cavities 34 and under subsequent pressure on the crests 31 this material will be compressed within the reduced cavity 34 to form a rib of the product which is itself compressed between the two cylinders as it rests upon the crests 31.

To encourage the fibrous material to enter the troughs 34 quite extensively the bases of the troughs 34 communicate by channels 40 with the interior 41 of the cylinder 10 which is itself connected to a vacuum source whereby the vacuum cylinder 60 (FIG. 1), which includes the vacuum source, will induce the fibrous material to flow towards the base of each channel 34.

The protrusions need not be annular and spaced axially across the cylinder as shown in FIG. 1, but the protrusion 30 could for example be studs spaced both axially and circumferentially from adjacent studs whereby a lattice work of ribs or protrusions will be formed on the finished product. Alternatively the channels 34 may extend axially of the moulding cylinder 10 rather than circumferentially thereof whereby the ribbing on the finished product would extend transversely of the sheet.

Referring to FIG. 7 there is shown an endless moulding belt 710 provided with a plurality of rubber projections spaced longitudinally along the belt and of a form shown in FIG. 4 but without the convex crests. The belt wraps rollers 77, 78 and 79 and a plain steel pressure roller 711 which may be heated. A fibre feed duct 76 is provided for feeding dry mouldable fibrous material onto and between the widely spaced cavities between protrusions on belt 710 as it passes over roller 77. A gear wheel 712 assists in compacting fibres into the cavities and providing a loose felt on the belt 710. The felt passes to the pressure nip between the belt 710 and roller 711 together with foamed starch 75 whereby there issues from the nip a ribbed product 713 comprising a consolidated base sheet provided with a plurality of upstanding consolidated rectangular shaped ribs extending transversely of the sheet. The sheet is easily removed from the belt 710 as it wraps around roller 78 as the protrusions again become more widely spaced apart, releasing the formed ribs.

As shown in more detail in FIG. 4 the mould belt 710 is seen to comprise a plurality of upstanding protrusions 30 having crests 31 in this case planar form and a diverging shank leading to an enlarged and thicker root 32. The faces 33 of the diverging shank of each protrusions 30 defines with its opposing face of the adjacent protrusions 30 a converging channel or cavity 34 within which moulding is to take place.

Rather than using pressure to effect moulding, in this case the action of wrapping the belt 710 about the roller 711 will effectively move the protrusions closer together from the full line shape shown in FIG. 4 to the broken line shape shown in that FIG. In the wrapped condition the previously convergent channels 34 will assume a rectangular section of smaller cross section.

In practise mouldable material pasing onto the belt 710 as it wraps the roller 77 will flow into the enlarged cavities 34 and when the belt wraps roller 711 this material will be compressed within the reduced cavities 34 to form ribs of the product which is itself compressed between the cylinder 711 and the belt 710 as it rests upon the crests 31.

To encourage the fibrous material to enter the troughs 34 quite extensively the bases of the troughs 34 may communicate by channels with the interior of the cylinder 77 which may be hollow and itself connected to a vacuum source whereby the vacuum cylinder 750 (FIG. 7), which includes the vacuum source, will induce the fibrous material to flow towards the base of each channel 34.

The protrusions on the belt need not be linear and spaced longitudinally along the belt as shown in FIG. 7 but the protrusions 30 could for example be studs spaced both axially and circumferentially from adjacent studs whereby a lattice work of ribs or protrusions will be formed on the finished product. Alternatively the channels 34 may extend longitudinally of the mould belt 710 rather than transversely thereof whereby the ribbing on the finished product would extend longitudinally of the sheet. FIGS. 8, 9 and 10 illustrate an apparatus for doing this.

Referring to FIG. 8 there is shown an endless belt so provided with longitudinally extending, transversely spaced protrusions 821. The belt 820 pases over a first Mount Hope type roller 822 curved upwardly and shown in FIG. 9, tending to space apart the protrusions 821. The belt passes over a second Mount Hope type roller 823 curved downwardly and tending to close up the spacing between protrusions 821 as seen in FIG. 10. A roller 824, which may be heated, presses onto roller 823 to form a pressure nip there between.

In operation fibres are deposited onto belt 820 at roller 822 where the fibres will settle in the widely spaced cavities between protrusions 821 and on the crests of protrusions 821 to form a loose felt. In passing through the nip between belt 820 and roller 824 the cavities will close consolidating the ribbing and the felt itself will be consolidated whereby a ribbed product will issue from the nip.

A section of ribbing which can be produced according to the apparatuses set forth above is shown in FIG. 5A to E which show the ribbed products in plan view.

Preferably the flexible protrusions of the cylinder mould 10 and the mould belts 710 and 820 are of rubber but any suitable compressable material can be used.

The cross sectional shape of the protrusion 30 can be varied to suit the shape of the ribs to be formed within the cavity 34. A multitude of cross sectional shapes is available including sinusoidal, linear, tapering, and the like. One form of rib is shown in FIG. 6. This is formed by by undercutting the roots of the protrusion 30 to form an enlarged head 42 on each rib 43. Depressions 44 which may be formed when the fibrous material is moulded into ribs can be removed by the addition of extra fibre or a subsequent hot consolidating operation, or by doctoring the fibrous matt onto the embossing cylinder 10.

Rather than laminate a simple liner aboard e.g. 17 to the crests of ribbed product as described with reference to FIG. 2 and 3B a further ribbed product may be laminated to the crests of a previously ribbed product and indeed the ribbings could be arranged to be transverse to one another to provide a lattice work similar to FIG. 5D. Particularly where each of the ribs is also of sinusoidal section a particularly strong product of cellular formation will be provided.

Although the invention has been described in one form with reference to its use in a moulding cylinder it will be clear that a platten could be used provided a suitable pressure platten cooperates therewith to form the ribbing on sheet fed fibrous material rather than reel fed material.

The apparatus described above preferably forms integral part of a dry forming machine since the ribbing and final product can be formed in line and need not be a separate operation from the dry forming operation itself.

It has become the practice to add starch to dry fibres by using a starch solution or by adding dry starch and subsequently spraying water. Starch solution causes blocking of the nozzles and all spraying can cause problems with streaking of the product and uneven application.

To overcome this problem it is proposed to add the starch as a foamed product, extruding it through a slice or rectangular slot onto a previously laid dry fibre matt. The web 12 of FIG. 1 and 2 may have been so laid. In FIG. 7 the starch may be added at 75 in a foamed state.

In the present invention this technique is particularly useful where special characteristics are required in the finished ribbed product. For example, if a very stiff product is required, a foamed solution of sodium silicate may be used. Other solutions in foam may include clay, fibres, usual and conventional starches, or latex. Gypsum is particularly suitable for use in making building or plaster boards. With foamed additives little if any drying equipment will be needed to finish the product since only essential moisture will be employed in forming and consolidating the fibre.

Where consolidation or fixing of particular additives such as starch is required under heat and pressure, the cylinder 11 of FIGS. 1 and 2, or the cylinders 711 and 824 of FIGS. 7 and 8 may be heated and applied under the required pressure to consolidate and fix the web additives as well as moulding the ribs.

The invention described above is particularly suitable for use with dry formed products since such products are readily mouldable under heat and pressure with or without the addition of moisture but it will be appreciated that the invention is equally applicable to any other mouldable sheet on which ribs, ribbings, ridges or other protrusions are required.

Where a substitute corrugated board is required the apparatus set forth above may be modified by including means for laminating a liner sheet of material to the crests of the ribs to provide a composite board.

The invention is particularly applicable to the continuous production of ribbed materials in sheet or reel form. The ribs or ridges may be formed longitudinally of the sheet transversely of the sheet or an any angle thereto and indeed a multiplicity of crossed ridges may be provided to form a lattice type structure thereby increasing the strength of the product so formed.

The ridges or ribs may be of forms other than planar and could be of any cross sectional shape although those of constant cross section or of tapering section would be the most commonly employed. The ribs need not be at 90° to the plane of the sheet but could be at any angle thereto. The ribs or ridges need not be linear in plan but could be for example sinusoidal to further increase the strength of the product.

I claim:

1. Apparatus for moulding ribs, ridges, studs and other upstanding projections on a mouldable material comprising a mould having an endless shaping surface and having a plurality of flexible protrusions defining therebetween at least one moulding cavity defined by the adjacent faces of the protrusions, the adjacent faces being movable when the protrusions are deformed by pressure for reducing the size of the cavity and for compacting any mouldable material therein.

2. Apparatus as claimed in claim 1 wherein the endless shaping surface is provided by the surface of a roller having said plurality of flexible protrusions thereon for providing a plurality of projections on an elongate sheet of mouldable material.

3. Apparatus as claimed in claim 2 wherein the flexible protrusions are of rubber.

4. Apparatus as claimed in claim 2 wherein the roller includes a vacuum cylinder having a vacuum source and the base of each moulding cavity is in communication with said vacuum source to draw mouldable material into the cavity.

5. Apparatus as claimed in claim 2 wherein the protrusions are axially spaced across the roller to provide longitudinal ribs on the elongate sheet.

6. Apparatus as claimed in claim 2 wherein the protrusions are longitudinally spaced around the roller to provide lateral ribs on the elongate sheet.

7. Apparatus as claimed in claim 1 wherein the endless shaping surface is provided by the surface of an endless belt having said plurality of rubber protrusions thereon to provide a plurality of projections on an elongate sheet of mouldable material.

8. Apparatus as claimed in claim 7 wherein the endless belt is foraminous and is associated with a vacuum cylinder having a vacuum source and the base of each mould being in communication with the vacuum source to draw mouldable material into the cavity.

9. Apparatus as claimed in claim 7 wherein the protrusions are longitudinally spaced on the belt to provide longitudinal ribs.

10. Apparatus as claimed in claim 7 wherein the protrusions are transversely spaced on the belt to provide transverse ribs.

11. Apparatus as claimed in claim 1 wherein the protrusions diverge from the crests to the roots to define tapering channels therebetween, the sides of said protrusions being deformable to define parallel sided moulding cavities.

12. Apparatus as claimed in claim 10 wherein the crests of the protrusions are convex.

13. Apparatus as claimed in claim 12 including a pressure cylinder defining a pressure nip with the roller, means for feeding mouldable material to said nip, and means for reeling the ribbed mouldable material so formed.

14. Apparatus as claimed in claim 7 including a pressure cylinder defining a pressure nip with the belt, means for feeding the mouldable material to said nip, and means for reeling the ribbed mouldable material so formed.

15. Apparatus as claimed in claim 1 including means for laminating a liner sheet of material to the crests of the ribs to provide a composite board.

* * * * *